US012682036B2

(12) United States Patent (10) Patent No.: US 12,682,036 B2
Suzuki (45) Date of Patent: Jul. 14, 2026

(54) VERIFICATION METHOD, VERIFICATION DEVICE, AND PROGRAM

(71) Applicant: Panasonic Intellectual Property Corporation of America, Torrance, CA (US)

(72) Inventor: Taro Suzuki, Ibaraki (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 76 days.

(21) Appl. No.: 18/438,668

(22) Filed: Feb. 12, 2024

(65) Prior Publication Data

US 2024/0184873 A1 Jun. 6, 2024

Related U.S. Application Data

(63) Continuation of application No. PCT/JP2022/024593, filed on Jun. 20, 2022.

(30) Foreign Application Priority Data

Aug. 24, 2021 (JP) ................................. 2021-136262

(51) Int. Cl.
 G06F 21/40 (2013.01)
(52) U.S. Cl.
 CPC .................................... G06F 21/40 (2013.01)
(58) Field of Classification Search
 CPC ...... G06F 21/40; G06F 16/587; G06F 16/438; G06F 16/435; H04L 12/2807; H04L 51/04; H04L 51/046; H04L 51/222; H04L 67/535; H04W 4/024; H04W 4/029
 See application file for complete search history.

(56) References Cited

U.S. PATENT DOCUMENTS

| | | | | | |
|---|---|---|---|---|---|
| 7,440,558 | B2 * | 10/2008 | Heilmann | ............... | H04M 3/38 |
| | | | | | 379/189 |
| 9,369,331 | B1 * | 6/2016 | Gill | ......................... | H04L 69/28 |
| 11,678,142 | B1 * | 6/2023 | Taylor | ..................... | G06F 21/32 |
| | | | | | 455/456.1 |
| 2010/0257364 | A1 * | 10/2010 | Baek | ..................... | H04L 9/3242 |
| | | | | | 380/279 |

(Continued)

FOREIGN PATENT DOCUMENTS

JP 2017-44778 3/2017

OTHER PUBLICATIONS

International Search Report issued Sep. 13, 2022 in International (PCT) Application No. PCT/JP2022/024593.

*Primary Examiner* — Lizbeth Torres-Diaz
(74) *Attorney, Agent, or Firm* — Wenderoth, Lind & Ponack, L.L.P.

(57) ABSTRACT

A verification method by a computer includes: accepting information that requires verification of presence of a user in a certain place; designating one or more first devices in the certain place as a verification-use device; notifying verification action information indicating execution guidance for a verification action to the verification-use device; collating information indicative of an action having been executed to the verification-use device after the notification of the verification action information with the verification action information; and outputting information indicative of a result of the collation.

11 Claims, 4 Drawing Sheets

(56) References Cited

U.S. PATENT DOCUMENTS

| | | | |
|---|---|---|---|
| 2016/0088021 A1* | 3/2016 | Jayanti Venkata .... | H04L 63/104 |
| | | | 726/1 |
| 2020/0320592 A1* | 10/2020 | Soule ...................... | H04W 4/10 |
| 2021/0377249 A1* | 12/2021 | Ouyang ................ | G07F 7/1016 |
| 2022/0037036 A1* | 2/2022 | DesRoches ............ | G16H 10/20 |
| 2022/0067136 A1* | 3/2022 | Lu ........................... | G06F 21/34 |
| 2022/0083052 A1* | 3/2022 | Oyama ................. | H04W 4/024 |
| 2022/0269803 A1* | 8/2022 | Kura .................... | G06F 21/565 |
| 2023/0308444 A1* | 9/2023 | Arai .................... | H04L 12/2807 |
| 2024/0039718 A1* | 2/2024 | Nara ...................... | G06F 21/60 |
| 2024/0104511 A1* | 3/2024 | Bhatnagar .......... | G06Q 10/1093 |

* cited by examiner

Figure 2:
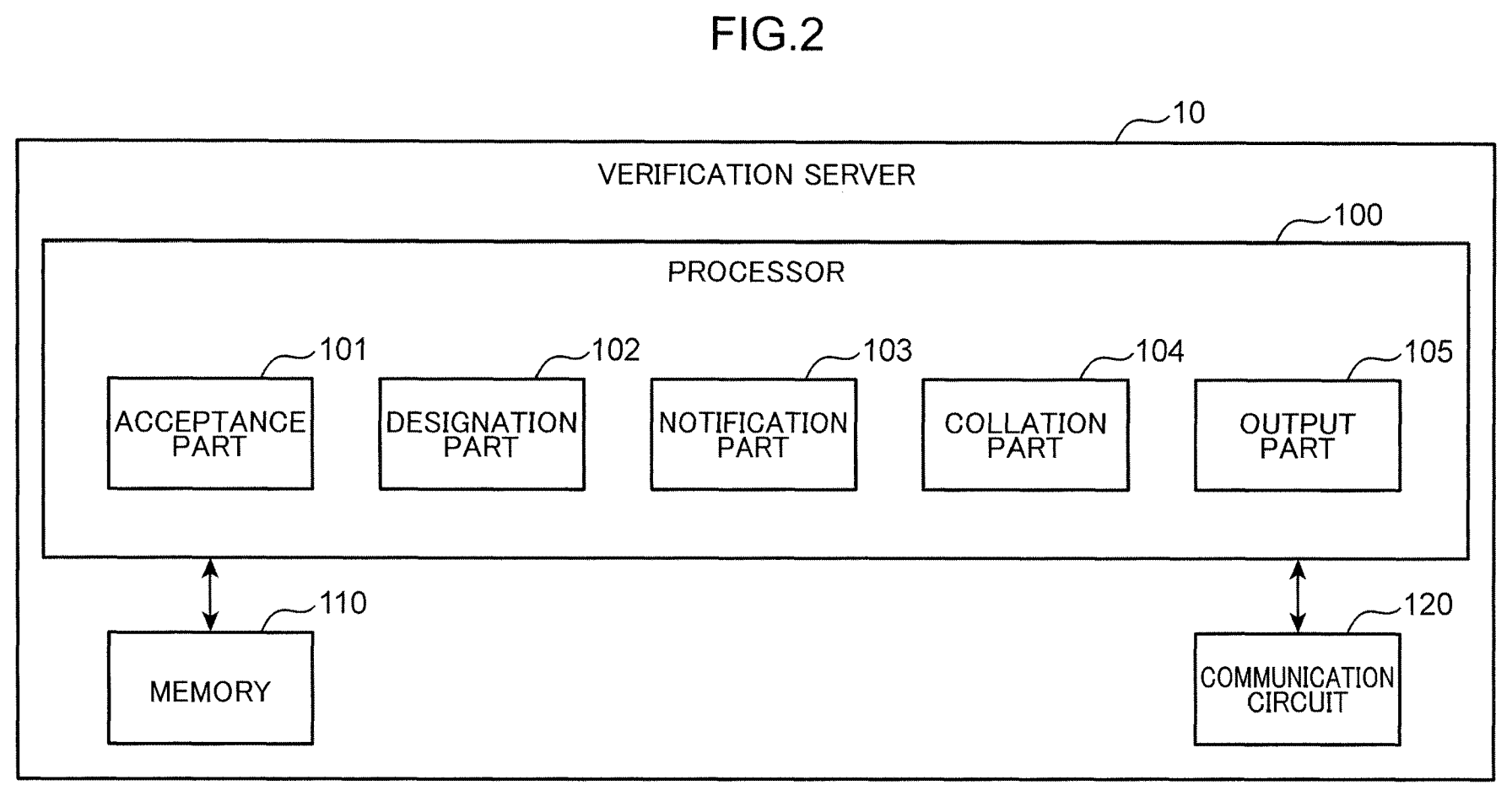

VERIFICATION SERVER 10

PROCESSOR 100

- ACCEPTANCE PART 101
- DESIGNATION PART 102
- NOTIFICATION PART 103
- COLLATION PART 104
- OUTPUT PART 105

MEMORY 110

COMMUNICATION CIRCUIT 120

VERIFICATION METHOD, VERIFICATION DEVICE, AND PROGRAM

FIELD OF INVENTION

The present disclosure relates to a technique of verification of presence of a user in a certain place.

BACKGROUND ART

Recently, multi-factor verification, which is a combination of verification methods, has been known to improve accuracy of personal verification. For example, Patent Literature 1 suggests realization of identity verification with a high security level by a simple configuration including a camera and a microphone.

However, in Patent Literature 1, no consideration can be seen to execute verification of presence of a user in a place with a device present in the place where the user should be present.

Patent Literature 1: Japanese Unexamined Patent Publication No. 2017-44778

SUMMARY OF THE INVENTION

The present disclosure has been made to solve the above-mentioned problems, and an object thereof is to provide a verification method, a verification device, and a non-transitory computer readable storage medium that enable verification of presence of a user in a certain place.

A verification method according to an aspect of the present disclosure, by a computer, includes: accepting information that requires verification of presence of a user in a certain place, designating one or more first devices in the certain place as a verification-use device, notifying verification action information indicating execution guidance for a verification action to the verification-use device, collating information indicative of an action having been executed to the verification-use device after the notification of the verification action information with the verification action information, and outputting information indicative of a result of the collation.

BRIEF DESCRIPTION OF THE DRAWINGS

FIG. 2 is a block diagram showing an exemplary structure of a verification server.

DETAILED DESCRIPTION

Figure 1:
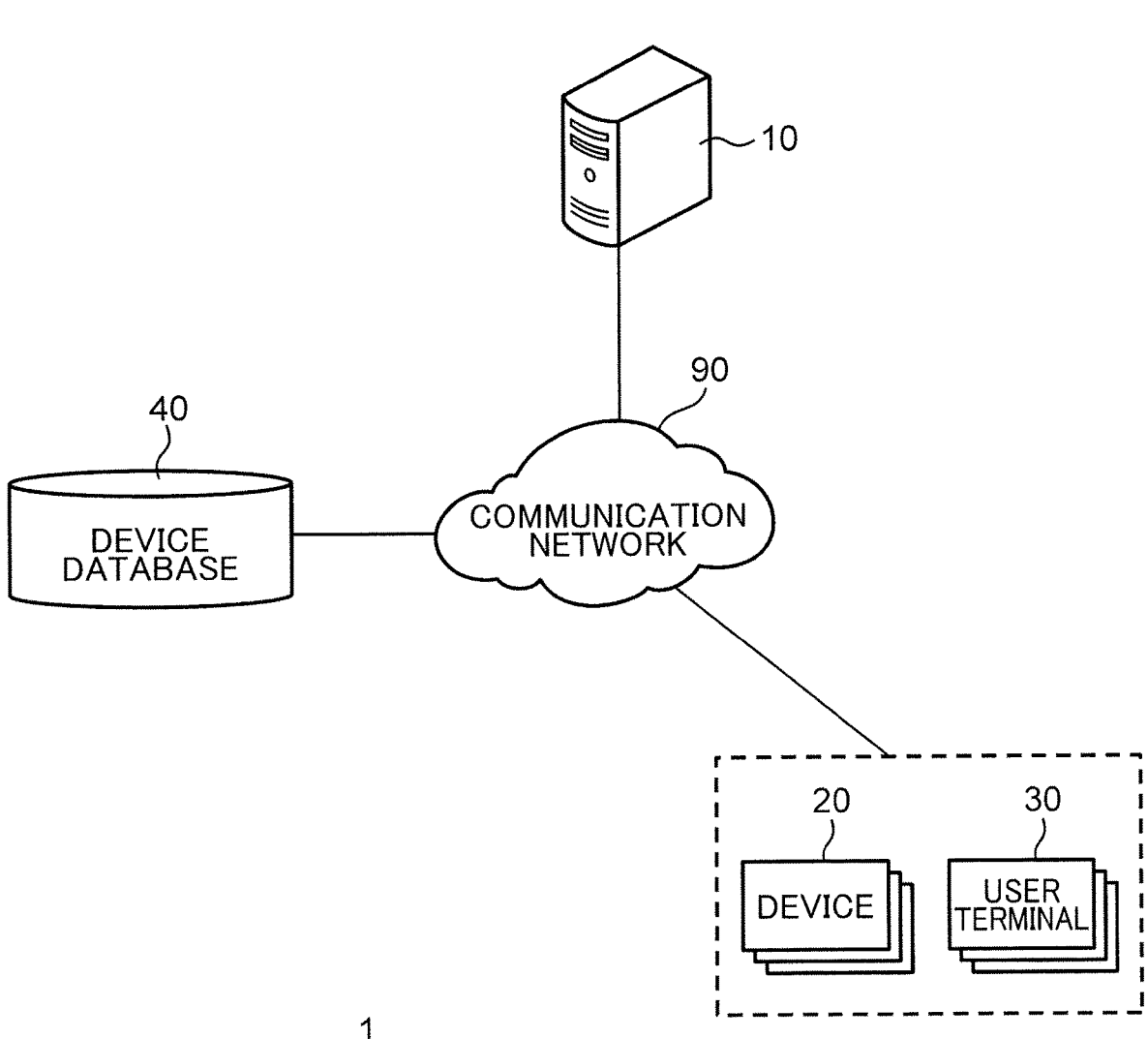
FIG. 1 is a diagram showing an exemplary whole structure of a verification system according to an embodiment of the present disclosure.

Circumstances that Led to the Present Disclosure

As described above, recently, multi-factor verification, which is a combination of verification methods, has been known to improve accuracy of personal verification. For example, Patent Literature 1 suggests improvement in the accuracy of personal verification by a combination of an identity verification with data of a personal image taken by a camera and an identity verification with data of a personal voice collected by a microphone.

However, in Patent Literature 1, no consideration can be seen to execute verification of presence of a user in a place with a device present in the place where the user should be present. Therefore, the technique in Patent Literature 1 may enable a personal verification of a user in communication using a mobile terminal, but cannot enable accurately grasping where the user is present.

Therefore, the present inventor has made eager studies on the technique of verification of presence of a user in a certain place, thus achieving each aspect of the present disclosure described below.

The verification method according to an aspect of the present disclosure, by a computer, includes: accepting information that requires verification of presence of a user in a certain place, designating one or more first devices in the certain place as a verification-use device; notifying verification action information indicating execution guidance for a verification action to the verification-use device; collating information indicative of an action having been executed to the verification-use device after the notification of the verification action information with the verification action information; and outputting information indicative of a result of the collation.

In this configuration, when information that requires verification of presence of a user in a certain place is accepted, one or more first devices in the certain place is designated as a verification-use device. Thereafter, verification action information indicating execution guidance for a verification action to the verification-use device is notified. Therefore, in the case that the user is present in the certain place, the user can execute the verification action to the verification-use device present in the certain place according to the guidance indicated by the notified verification action information.

In this configuration, subsequently, information indicative of an action having been executed to the verification-use device after the notification of the verification action information is collated with the verification action information, and a result of the collation is output. Therefore, a person who inputs information that requires the verification can verify that the user is present in the certain place when the result of the collation indicates that an action having been executed to the verification-use device present in the certain place agrees with the verification action to the verification-use device indicated by the verification action information.

In the verification method, in the designation of the verification-use device, a device that is executable among the one or more first devices may be designated as the verification-use device.

In this configuration, a device that is executable among the one or more first devices present in the certain place is designated as the verification-use device. This prevents designation of a device that is not executable as the verification-use device. This can prevent the user that is present in the certain place from being verified to not be present in the certain place because of impracticability of the verification action to the verification-use device.

The verification method may further include acquiring history information indicative of a history of the action that has been executed to the verification-use device, and in the notification of the verification action information, an action which is lower in execution frequency among actions executable to the verification-use device than a predetermined frequency may be determined with reference to the history information as the verification action.

In this configuration, an action which is lower in execution frequency among actions executable to the verification-use device than a predetermined frequency is determined as the verification action. This can prevent determination of an action which is higher in execution frequency than a predetermined frequency to the verification-use device as the verification action.

In the case that the user is not present in the certain place, thus, the possibility can be reduced that the user is erroneously verified to be present in the certain place due to the fact that another person frequently executes the verification action to the verification-use device.

In the verification method, the one or more first devices may include a plurality of first devices, in the designation of the verification-use device, the plurality of first devices may be designated as the verification-use device, in the notification of the verification action information, verification actions to the plurality of first devices may be determined and information indicating execution guidance for the respective verification actions to the plurality of first devices may be notified as the verification action information, and in the collation, information indicative of respective actions that have been executed to the plurality of first devices after the notification of the verification action information may be collated with the verification action information.

In this configuration, the person who inputs the information that requires the verification can verify that the user is present in the certain place when the result of the collation indicates that the respective verification actions having been executed to the plurality of first devices designated as the verification-use device after the notification of the verification action information agree with the respective verification actions to the plurality of first devices indicated by the verification action information. Thus, this configuration enables a more accurate verification in comparison with a case that one first device that is present in the certain place is designated as the verification-use device.

In the verification method, the verification action information may include action sequence information indicating an execution sequence for the respective verification actions to the plurality of first devices, and in the collation, an execution order in which the respective verification actions have been executed to the plurality of first devices after the notification of the verification action information may be further collated with the execution sequence for the respective verification actions to the plurality of first devices indicated by the action sequence information.

In this configuration, the person who inputs the information that requires the verification can verify that the user is present in the certain place when the result of the collation indicates that: the respective verification actions having been executed to the plurality of first devices agree with the respective verification actions to the plurality of first devices; and the execution order in which the respective verification actions have been executed to the plurality of first devices agrees with the execution sequence indicated by the action sequence information. Thus, this configuration enables a more accurate verification in comparison with a case that the verification action information does not include the action sequence information.

In the verification method, the verification action information may further include condition information indicating a condition for a time interval between a verification action on a second device included in the plurality of first devices and a verification action on a third device included in the plurality of first devices, and in the collation, a time interval between an action having been executed to the second device and an action having been executed to the third device may be further collated with the condition indicated by the condition information.

In this configuration, the person who inputs the information that requires the verification can verify that the user is present in the certain place when the result of the collation indicates that: the respective verification actions having been executed to the plurality of first devices agree with the respective verification actions to the plurality of first devices; the execution order in which the respective verification actions have been executed to the plurality of first devices agrees with the execution sequence indicated by the action sequence information; and the time interval between the action to the second device and the action to the third device satisfies the condition indicated by the condition information. Thus, this configuration enables a more accurate verification in comparison with a case that the verification action information does not include the condition information.

In the verification method, the action sequence information may indicate that the verification action to the third device is executed after the verification action to the second device is executed.

In this configuration, the person who inputs the information that requires the verification can verify that the user is present in the certain place when the result of the collation indicates that: the respective verification actions having been executed to the plurality of first devices agree with the respective verification actions to the plurality of first devices; the execution order in which the respective verification actions have been executed to the plurality of first devices agrees with the execution sequence indicated by the action sequence information; and the time interval between the two consecutive verification actions of the verification action to the second device and the verification action to the third device satisfies the condition indicated by the condition information.

In the verification method, the action sequence information may indicate that the verification action to the second device is executed firstly and the verification action to the third device is executed finally.

In this configuration, the person who inputs the information that requires the verification can verify that the user is present in the certain place when the result of the collation indicates that: the respective verification actions having been executed to the plurality of first devices agree with the respective verification actions to the plurality of first devices; and the time interval between the verification action to the second device that is executed firstly and the verification action to the third device that is executed finally satisfies the condition indicated by the condition information.

The verification method may further include acquiring position information indicative of a position at which a verification-use device is disposed, and in the notification of the verification action information, the execution sequence indicated by the action sequence information may be determined with reference to the position information so as to ensure a minimum movement distance until the verification action to the third device is executed after the verification action to the second device is executed.

In this configuration, the execution sequence of the respective verification actions to the plurality of first devices is determined so as to ensure a minimum movement distance until the last verification action is executed after the first verification action is executed. This can make the time necessary for the user to do the verification actions minimum.

The verification method may further include acquiring position information indicative of a position at which a verification-use device is disposed, and in the notification of the verification action information, the execution sequence indicated by the action sequence information may be determined with reference to the position information so as to ensure a maximum movement distance until the verification action to the third device is executed after the verification action to the second device is executed.

In this configuration, the execution sequence of the respective verification actions to the plurality of first devices is determined so as to ensure a maximum movement distance until the last verification action is executed after the first verification action is executed. Therefore, the possibility can be reduced that the execution sequence of the respective verification actions to the plurality of first devices becomes the same as a normally executed order thereof in the certain place.

In the case that the user is not present in the certain place, thus, the possibility can be reduced that the user is erroneously verified to be present in the certain place due to the fact that another person executes the respective verification actions to the plurality of first devices in the execution sequence indicated by the action sequence information.

A verification device according to another aspect of the present disclosure includes: an acceptance part for accepting information that requires verification of presence of a user in a certain place; a designation part for designating one or more first devices in the certain place as a verification-use device; a notification part for notifying verification action information indicating execution guidance for a verification action to the verification-use device; a collation part for collating information indicative of an action having been executed to the verification-use device after the notification of the verification action information with the verification action information; and an output part for outputting information indicative of a result of the collation.

This configuration exerts the same advantageous effects as those described for the verification method.

A non-transitory computer readable storage medium according to another aspect of the present disclosure is a non-transitory computer readable storage medium storing a program causing a computer to serve as: an acceptance part for accepting information that requires verification of presence of a user in a certain place; a designation part for designating one or more first devices in the certain place as a verification-use device; a notification part for notifying verification action information indicating execution guidance for a verification action to the verification-use device; a collation part for collating information indicative of an action having been executed to the verification-use device after the notification of the verification action information with the verification action information; and an output part for outputting information indicative of a result of the collation.

This configuration exerts the same advantageous effects as those described for the verification method.

The present disclosure can be realized as a system operated by the program. Additionally, it goes without saying that the program is distributable as a non-transitory computer readable storage medium like a CD-ROM, or distributable via a communication network like the Internet.

Each of the embodiments which will be described below represents a specific example of the disclosure. Numerical values, shapes, constituent elements, steps, and the order thereof described below are mere examples, and thus should not be construed to delimit the disclosure. Further, constituent elements which are not recited in the independent claims each showing the broadest concept among the constituent elements in the embodiments are described as selectable constituent element. The respective contents are combinable with each other in all the embodiments.

First Embodiment

The first embodiment of the present disclosure will be described below with reference to the drawings. FIG. 1 is a diagram showing an exemplary whole structure of a verification system 1 according to an embodiment of the present disclosure. The verification system 1 includes one or more devices 20 and a user terminal 30, a device database 40 (hereinafter, device DB), and a verification server 10 (an exemplary verification device).

The device 20, the user terminal 30, and the verification server 10 are communicably connected with each other through a communication network 90. The communication network 90 is, for example, a public communication line such as the Internet. The communication network 90 may be a local area network.

The device 20 is present in a facility that is employed by a user. The device 20 may be communicably connected to another device 20 and the user terminal 30 through a local network in the facility. The facility is, for example, a house. The house is a multifamily residential, or may be a detached house. The facility may be an office. In the case that the facility is a house, the user of the device 20 includes a resident. In the case that the facility is an office, the user of the device 20 includes an employer of the office. Hereinafter, a resident in the facility and an employer thereof are referred to as the user.

The device 20 includes an electronic device disposed at a certain position in the facility, e.g., a washing machine, a rice cooker, a refrigerator, a microwave oven, an air conditioner, or an electronic lock. The device 20 also includes an electronic device that is movable in the facility, e.g., a robot vacuum.

The device 20 periodically transmits log information indicative of an operational state thereof to the verification server 10. The verification server 10 acquires the log information from the device 20 to store it in the device DB 40. The log information includes information indicative of a date and time of transmission of the log information (hereinafter, date-and-time information), identification information of the device 20, information indicative of the operational state of the device 20 (hereinafter, state information), and information indicative of an action having been executed to the device 20 (hereinafter, action information). The operational state of the device 20 includes an idle state in which the device 20 stands by for an action, a state in which the device 20 is in operation, and a state in which the device has an abnormality.

The user terminal 30 is an information communication terminal that is used by each of one or more users employing the facility, e.g., a laptop computer, a smartphone, or a tablet. The user terminal 30 has a liquid crystal display for displaying each information, a speaker for outputting sound indicated by each sound data, a control implement for performing various controls of the user terminal 30 such as input of information, e.g., a touchscreen or a hard key, and a communication circuit for communication with an external device such as the verification server 10 through the communication network 90.

The user terminal 30 displays information transmitted to an address for notification of information to the user of the user terminal 30 on the liquid crystal display when the communication circuit receives the information. The user terminal 30 causes the speaker to output sound indicated by sound data transmitted to the address for notification of information to the user of the user terminal 30 when the communication circuit receives the sound data.

The device DB 40 includes a storage device, e.g., an HDD or an SSD. The device DB 40 stores information on the device 20 (hereinafter, device information). The device information includes the log information, information for managing the device 20 (hereinafter, device management information), and information for managing the facility in which the device 20 is present (hereinafter, facility information).

The device management information includes the identification information of the device 20, identification information of the facility in which the device 20 is present, and information indicative of actions executable to the device 20 (hereinafter, executable action information). The identification information of the facility is, for example, the address of the facility.

The facility information includes the identification information of the facility, identification information of one or more users employing the facility, and information indicative of an address for notification of information to each of the one or more users (hereinafter, address information). The address information includes, for example, an e-mail address of the user and an IP address of the user terminal 30 of the user.

The verification server 10 includes a server device or a cloud server. The verification server 10 performs a verification when receiving information (hereinafter, verification requiring information) that requires verification of presence of a user in a facility (an exemplary certain place) employed by the user from an external server connected to the communication network 90. The verification will be described later. Hereinafter, a facility employed by a user is referred to as a user employing facility.

FIG. 2 is a block diagram showing an exemplary structure of a verification server 10. The verification server 10 includes a communication circuit 120, a processor 100 (an exemplary computer), and a memory 110.

The communication circuit 120 is compatible with a communication system by use of the communication network 90 such as Ethernet (registered trademark) and connects the verification server 10 to the communication network 90.

The communication circuit 120 receives the log information from the device 20 through the communication network 90. The communication circuit 120 outputs to the processor 100 each of the received information through the communication network 90. The communication circuit 120 transmits each of the information to the external device connected to the communication network 90 through the communication network 90 under control by the processor 100.

The processor 100 includes, for example, a CPU. The processor 100 controls the verification server 10. For example, the processor 100 serves as an acceptance part 101, a designation part 102, a notification part 103, a collation part 104, and an output part 105 to execute the verification. The acceptance part 101 to the output part 105 may do performance when the processor 100 executes a certain program, or may be constituted by dedicated hardware. The acceptance part 101 to the output part 105 will be described later.

The memory 110 includes: a rewritable non-volatile semiconductor memory such as a flash memory; a hard disk drive (HDD); and a solid state drive (SSD).

Figure 3:
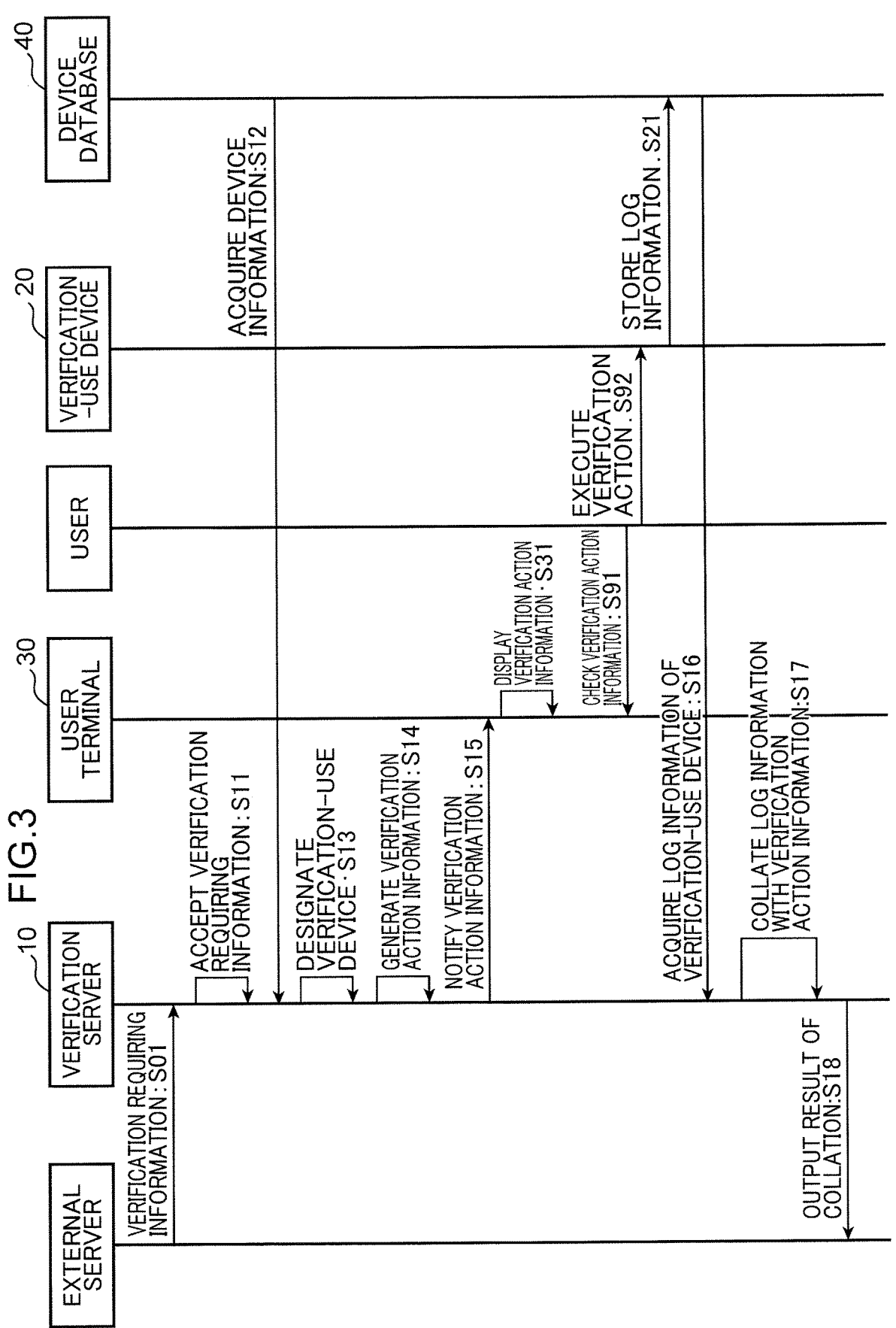
FIG. 3 is a sequence diagram of an exemplary verification in a first embodiment.

Next, the verification executed by the verification server 10 will be explained. In the description, the acceptance part 101 to the output part 105 will be described (FIG. 2). FIG. 3 is a sequence diagram of an exemplary verification in the first embodiment.

As shown in FIG. 3, the external server connected to the communication network 90 transmits to the verification server 10 verification requiring information that requires verification of presence of a user in a user employing facility (Step S01). The verification requiring information includes identification information of the user and identification information of the user employing facility.

In the verification server 10, the acceptance part 101 accepts the verification requiring information after the communication circuit 120 receives the verification requiring information from the external server (Step S11).

Next, the designation part 102 acquires device information on a device 20 present in the user employing facility from the device DB 40 (Step S12).

Specifically, in Step S12, the designation part 102 acquires the identification information of the user employing facility from the verification requiring information. The designation part 102 acquires from the device DB 40 device management information and facility information including identification information of a facility that agrees with the identification information of the user employing facility. The designation part 102 further acquires identification information of the device 20 included in the acquired device management information, and acquires log information including the identification information of the device 20 from the device DB 40.

The designation part 102 then refers to the device information acquired in Step S12 to designate one or more devices 20 (an exemplary first device) present in the user employing facility as a device for the verification (hereinafter, verification-use device) (Step S13).

For example, in Step S13, the designation part 102 designates a device 20 that is executable among the one or more first devices 20 present in the user employing facility as the verification-use device.

Specifically, the designation part 102 refers to log information indicating that a device 20 is executable, among the log information acquired in Step S12. The log information indicating that a device 20 is executable includes state information indicating that the device 20 is in the idle state or in operation. The designation part 102 designates a device 20 corresponding to the referred log information as the verification-use device. The device 20 corresponding to the log information is a device 20 that is identified by the identification information of the device 20 included in the log information.

Alternatively, in Step S13, the designation part 102 may randomly designate a predetermined number of, i.e., one or more, devices 20 as the verification-use device among the one or more devices 20 present in the user employing facility.

Next, the notification part 103 generates information (hereinafter, verification action information) indicating execution guidance for a verification action to the verification-use device designated in Step S13 (Step S14).

Specifically, in Step S14, the notification part 103 refers to device management information including the identification information of the verification-use device designated in Step S13 among the device management information acquired in Step S12. The notification part 103 randomly selects one action among actions executable to the verification-use device that are indicated by the executable action information included in the referred device management information. The notification part 103 determines the selected one action as a verification action to the verification-use device designated in Step S13.

For example, in Step S13, a washing machine and a refrigerator are designated as the verification-use device. In this case, the notification part 103 determines in Step S14, for example, an action of opening a lid randomly selected among actions executable to the washing machine indicated by the executable action information included in the device management information including the identification information of the washing machine as the verification action to the washing machine. Similarly, the notification part 103 determines, for example, an action of opening a door of the refrigerator as the verification action to the refrigerator.

The notification part 103 then generates verification action information indicating execution guidance for the action of opening the lid of the washing machine and the action of opening the door of the refrigerator. The verification action information is text information and/or sound data representing, for example, "Execute the action of opening the lid of the washing machine and the action of opening the door of the refrigerator".

Next, the notification part 103 notifies the verification action information generated in Step S14 (Step S15).

Specifically, the notification part 103 refers to the facility information acquired in Step S12, and acquires address information indicating an address at which information is notified to a user indicated by the verification requiring information accepted in Step S11. The user indicated by the verification requiring information is a user that is identified by the identification information of the user included in the verification requiring information. The notification part 103 controls the communication circuit 120 to transmit the verification action information generated in Step S14 to the address indicated by the address information.

The communication circuit of the user terminal 30 used by the user indicated by the verification requiring information accepted in Step S11 receives the verification action information transmitted to the address for the notification of information to the user, and the verification action information is displayed on the liquid crystal display (Step S31).

Thereafter, the user checks the verification action information displayed on the liquid crystal display of the user terminal 30 (Step S91), and executes the verification action to the verification-use device according to the guidance indicated by the verification action information (Step S92). Since the verification-use device periodically transmits the log information to the verification server 10, the device DB 40 stores log information indicative of the operational state of the verification-use device after the notification of the verification action information in Step S15 consequently (Step S21).

After Step S15, the collation part 104 of the verification server 10 acquires log information indicative of the action having been executed to the verification-use device after the notification of the verification action information from the device DB 40 at a predetermined time (Step S16).

Specifically, the collation part 104 executes Step S16 at a time when a certain time elapses after the notification of the verification action information in Step S15. The certain time is set to be sufficiently longer (e.g., 5 minutes) than the time that is considered to be necessary for the verification action to the verification-use device indicated by the verification action information notified in Step S15.

In Step S16, the collation part 104 acquires from the device DB 40 log information including the identification information of the verification-use device designated in Step S13 and date-and-time information indicating a date and time after the notification of the verification action information in Step S15.

The time at which the collation part 104 executes Step S16 is not limited to this. For example, the user may transmit information indicating completion of the verification action (hereinafter, action completion information) to the verification server 10 by controlling the user terminal 30 after executing the verification action to the verification-use device in Step S92. In this case, the collation part 104 executes Step S16 at the time of the communication circuit 120 receiving the action completion information.

Next, the collation part 104 collates the log information acquired in Step S16 with the verification action information notified in Step S12 (Step S17).

Specifically, in Step S17, the collation part 104 collates the action having been executed to the verification-use device after the notification of the verification action information in Step S15, indicated by the action information included in the log information acquired in Step S16, with the verification action to the verification-use device indicated by the verification action information notified in Step S15.

Next, the output part 105 controls the communication circuit 120 to send in response (output) information indicating a result of the collation in Step S17 to the external server that has transmitted the verification requiring information accepted in Step S11 (Step S18).

For example, the washing machine and the refrigerator are designated as the verification-use device in Step S13; verification action information indicating execution guidance for the action of opening the lid of the washing machine and the action of opening the door of the refrigerator is generated in Step S14; and the verification action information is notified to the user in Step S15.

In this case, in Step S17, the collation part 104 collates the actions having been executed to the washing machine and the refrigerator after the notification of the verification action information in Step S15, indicated by the action information included in the log information acquired in Step S16, with the action of opening the lid of the washing machine and the action of opening the door of the refrigerator indicated by the verification action information.

In the case that the action having been executed to the washing machine after the notification of the verification action information is the action of opening the lid of the washing machine and the action having been executed to the refrigerator after the notification of the verification action information is the action of opening the door of the refrigerator, the collation part 104 generates information (hereinafter, collation result information) indicating that the user is present in the user employing facility. Otherwise, the collation part 104 generates collation result information indicating that the user is not present in the user employing facility.

In Step S18, the output part 105 sends in response the collation result information generated in Step S17 to the external server that has transmitted the verification requiring information accepted in Step S11.

In the configuration of the first embodiment, the user can execute, if present in the user employing facility, the verification action to the verification-use device present in the user employing facility according to the guidance indicated by the verification action information notified in Step S15. In this case, in Step S17, the information indicating the action having been executed to the verification-use device after the notification of the verification action information is collated with the verification action information, and the collation result information indicating the result of the collation is sent to the external server in response.

Accordingly, the external server can verify that the user is present in the user employing facility when the collation result information indicates that the action having been executed to the verification-use device present in the user employing facility agrees with the verification action to the verification-use device indicated by the verification action information.

Thus, for example, this configuration can be used for verifying that a contract party to a private service, e.g., who made a contract for a mobile phone or opening a bank account, resides in the house that is indicated by the address given when the contract was made. The configuration can be also used for verifying that a user, who is allowed to use in their house a service that is relevant to the address of each household and provided by a public agency, e.g., application for benefits for an individual household, acquisition of a copy of a certificate of residence, or election by vote, resides in the house that is indicated by the address written in the certificate of residence.

The configuration can be also used for verifying that a buyer of an expensive product having a predetermined price or more resides in the house that is indicated by the address given by the buyer of the product when buying it, in order to guarantee the shipping address for the product. The configuration can be also used for application for a service with restriction on use thereof only by one time for one household, e.g., entry for a lottery. Specifically, the applicant is made to give the address when applying for the service; the configuration is used to verify that the applicant resides in the house at the address. This enables notification to the applicant that the use of the service is restricted to only one time for one household in a case that the verification by use of the same address is executed two or more times.

Additionally, in Step S13, in the designation of a device 20 that is executable among the one or more devices 20 present in the user employing facility as the verification-use device, a device 20 that is not executable is not designated as the verification-use device. This can prevent the user that is present in the user employing facility from being verified to not be present in the user employing facility because of impracticability of the verification action to the verification-use device.

Second Embodiment

Figure 4:
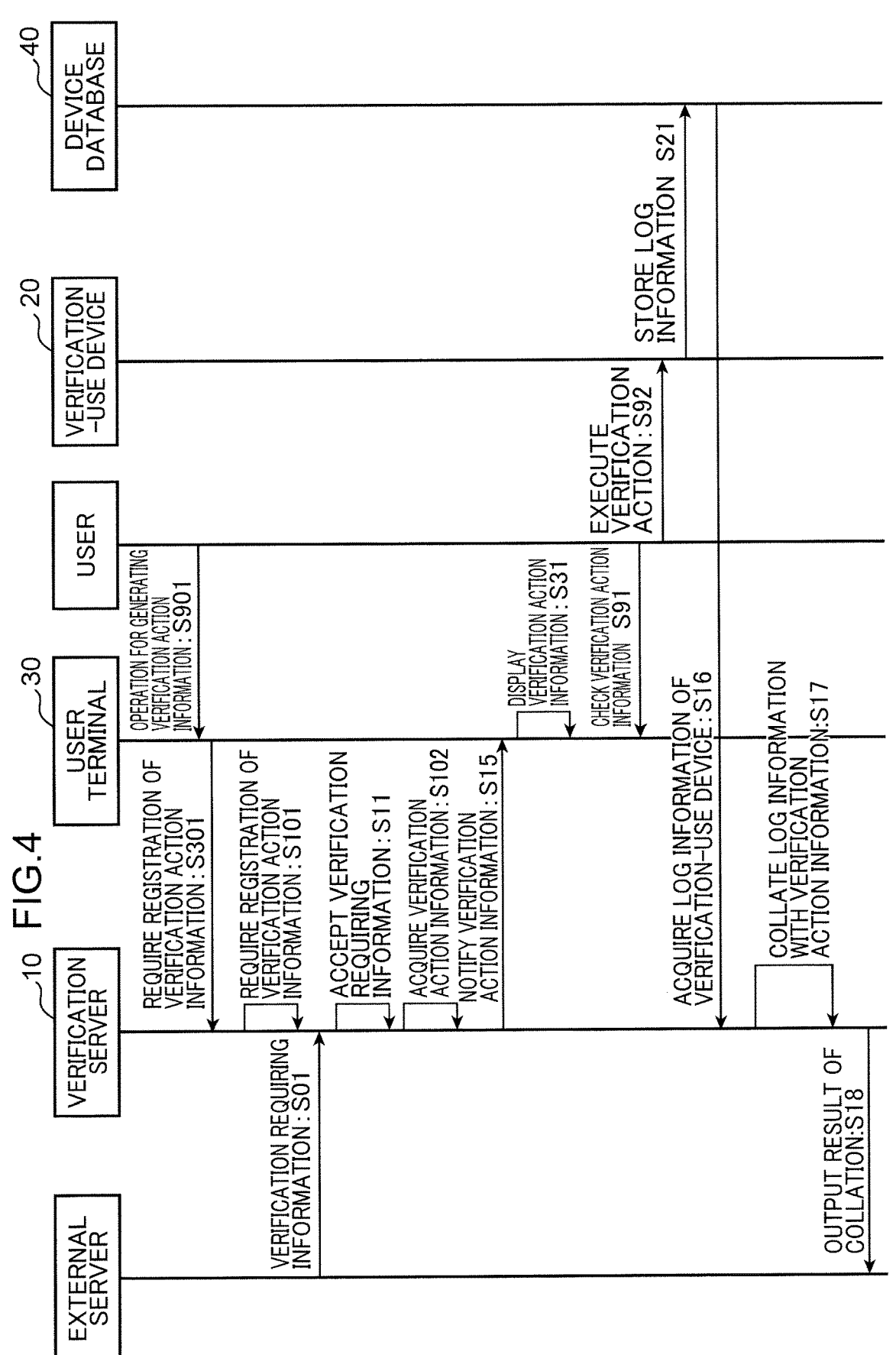
FIG. 4 is a sequence diagram of an exemplary verification in a second embodiment.

In the first embodiment above, an exemplary verification by the verification server 10 by use of verification action information after the generation of the verification action information based on the device information stored in the device DB 40 is described. In the second embodiment, the verification server 10 executes the verification of presence of the user in the user employing facility by use of verification action information that is manually generated by controlling the user terminal 30. The difference of the second embodiment from the first embodiment will be described below. FIG. 4 is a sequence diagram of an exemplary verification in the second embodiment.

As shown in FIG. 4, the user executes a predetermined operation for generating the verification action information through the user terminal 30 (Step S901). Specifically, the predetermined operation executed in Step S901 includes a task of designating one or more devices 20 present in the user employing facility as the verification-use device, a task of determining a verification action to each of the one or more devices 20, and a task of generating information indicating execution guidance for the respective verification actions to the one or more devices 20 as the verification action information.

Next, the user terminal 30 transmits to the verification server 10 information (hereinafter, registration requiring information) that requires registration of the verification action information generated in Step S901 (Step S301). The registration requiring information includes the identification information of the user and the verification action information generated in Step S901.

In the verification server 10, the communication circuit 120 receives the registration requiring information, and the processor 100 stores in the memory 110 the identification information of the user and the verification action information included in the registration requiring information with them being associated with each other (Step S101).

Thereafter, in the verification server 10, when Step S11, which is the same as in the first embodiment, is executed, Step S12 to Step S14 are omitted (FIG. 3) and Step S102 is executed.

In Step S102, the notification part 103 acquires the identification information of the user included in the verification requiring information accepted in Step S11, and acquires from the memory 110 the verification action information associated with the identification information of the user (Step S102). Thereafter, the processes in Step S15 and below, which are the same as those in the first embodiment, are executed by use of the verification action information acquired in Step S102.

Accordingly, the configuration of the second embodiment enables the verification of presence of the user in the user employing facility by use of the verification action information generated by the user in advance. Thus, this configuration can be used, for example, in a service of remotely determining settings of a device used in an individual household for verifying that the user is a root user (superuser, administrator) of the device. In other words, the configuration can be used for making the user execute the verification action to the verification-use device indicated by the verification action information generated by the root user in advance, instead of making the user input a password for the root user.

Similarly, the configuration can be used, for example, in a service that utilizes sensor information on a surveillance camera in the user employing facility for giving a privilege (use permission) of reference to the sensor information, or in a service of remotely controlling an installation or a device in the user employing facility for giving a privilege of remote control. The configuration can prevent providers of the services from referring to the sensor information in the facility without permission or remotely controlling the installation and the device in the facility at will when the user is not present in the user employing facility.

A home security service makes a phone call on a contract party when an abnormality in a facility of the contract party such as intrusion by a suspicious person and a fire is detected, in order to ascertain the situation in the facility, e.g., whether the detection of the abnormality is a misdetection or not. The configuration can be used also in this case. Specifically, when the call is made, the contract party is made to execute the verification action to the verification-use device indicated by the verification action information that is generated by the contract party in advance; if the contract party is verified to be an employer of the facility consequently, the situation in the facility can be ascertained through the contract party.

In the present disclosure, the following modifications may be implemented.

(1) In Step S14 (FIG. 3), the notification part 103 may determine an action which is lower in execution frequency among actions executable to the verification-use device than a predetermined frequency as the verification action with reference to the action information (exemplary history information) included in the log information acquired in Step S12 (FIG. 3).

The action which is lower in the execution frequency than the predetermined frequency includes an action that has never been executed. The execution frequency of a first action is, for example, the number of times of execution of the first action relative to the total number of times of execution of the actions to the verification-use device (=the number of times of execution of the first action/the total number of times). In a case that there is a plurality of actions that are lower in the execution frequency than the predetermined frequency, the notification part 103 may randomly select one action among the plurality of actions and determine the selected action as the verification action.

In this configuration, an action which is lower in execution frequency among actions executable to the verification-use device than a predetermined frequency is determined as the verification action. This can prevent determination of an action which is higher in execution frequency than a predetermined frequency to the verification-use device as the verification action. In the case that the user is not present in the user employing facility, thus, the possibility can be reduced that the user is erroneously verified to be present in the user employing facility due to the fact that another person frequently executes the verification action to the verification-use device.

(2) In the case that a plurality of devices 20 (exemplary first devices) is designated as the verification-use device in Step S13 (FIG. 3), the notification part 103 may determine, in Step S14 (FIG. 3), not only respective verification actions to the plurality of devices 20, but also an execution sequence for the respective verification actions to the plurality of devices 20. The notification part 103 may include information on the determined sequence (hereinafter, action sequence information) in the verification action information.

Further, the collation part 104 may accordingly collate, in Step S17 (FIG. 3), an execution order in which the respective verification actions have been executed to the plurality of devices 20 designated as the verification-use device with the execution sequence for the respective verification actions to the plurality of devices 20 indicated by the action sequence information.

For example, in Step S13 (FIG. 3), the washing machine and the refrigerator are designated as the verification-use device; in Step S14 (FIG. 3), the notification part 103 determines an action of opening the lid of the washing machine as the verification action to the washing machine, and an action of opening the door of the refrigerator as the verification action to the refrigerator.

In this case, the notification part 103 further randomly determines the execution sequence for the respective verification actions to the washing machine and the refrigerator. For example, the notification part 103 determines that the action of opening the lid of the washing machine is executed firstly and the action of opening the door of the refrigerator is executed secondly. The notification part 103 thereafter generates verification action information including action sequence information indicating that the action of opening the lid of the washing machine is executed firstly and the action of opening the door of the refrigerator is executed secondly.

The verification action information is text information and/or sound data representing, for example, "Execute the action of opening the lid of the washing machine firstly and the action of opening the door of the refrigerator secondly". In this example, the action sequence information is text information and/or sound data representing "firstly" and "secondly".

In Step S17 (FIG. 3), the collation part 104 collates the respective actions having been executed to the washing machine and the refrigerator after the notification of the verification action information in Step S15 (FIG. 3), indicated by the action information included in the log information acquired in Step S16 (FIG. 3), with the action of opening the lid of the washing machine and the action of opening the door of the refrigerator indicated by the verification action information notified in Step S15.

The collation part 104 further refers to the date-and-time information and the action information included in the log information acquired in Step S16 (FIG. 3), and collates an execution order in which the respective actions have been executed to the washing machine and the refrigerator after the notification of the verification action information in Step S15 (FIG. 3) with the execution sequence for the action of opening the lid of the washing machine and the action of opening the door of the refrigerator, indicated by the action sequence information included in the verification action information notified in Step S15.

Specifically, the collation part 104 refers to the date-and-time information and the action information included in the log information acquired in Step S16 (FIG. 3); in the case that the first action executed after the notification of the verification action information is the action of opening the lid of the washing machine and the second action executed thereafter is the action of opening the door of the refrigerator as in the sequence indicated by the action sequence information, the collation part 104 generates collation result information indicating that the user is present in the user employing facility. Otherwise, the collation part 104 generates collation result information indicating that the user is not present in the user employing facility.

This configuration enables the verification of presence of the user in the user employing facility when the collation result information indicates that: the respective verification actions having been executed to the plurality of devices 20 designated as the verification-use device agree with the respective verification actions to the plurality of devices 20; and the execution order in which the respective verification actions have been executed to the plurality of devices 20 agrees with the execution sequence indicated by the action sequence information. Thus, this configuration enables a more accurate verification in comparison with a case that the verification action information does not include the action sequence information.

(3) In the configuration of Modification (2), in Step S14, the notification part 103 may further include in the verification action information, information (hereinafter, condition information) on a condition for a time interval between a verification action to one device (an exemplary second device) included in a plurality of devices 20 designated as the verification-use device in Step S13 (FIG. 3) and a verification action to another device (an exemplary third device) included in the plurality of devices 20.

Further, the collation part 104 may accordingly collate, in Step S17 (FIG. 3), a time interval between an action having been executed to the one device 20 and an action having been executed to the another device 20 with the condition indicated by the condition information.

For example, in Step S13 (FIG. 3), the washing machine, the refrigerator, and the microwave oven are designated as the verification-use device; in Step S14, the notification part 103 determines the action of opening the lid of the washing machine, the action of opening the door of the refrigerator, and the action of opening the door of the microwave oven as the respective verification actions to the washing machine, the refrigerator, and the microwave oven.

Further, the notification part 103 generates verification action information including action sequence information indicating that the action of opening the lid of the washing machine is executed firstly, the action of opening the door of the refrigerator is executed secondly, and the action of opening the door of the microwave oven is executed thirdly.

In this case, the notification part 103 further includes in the verification action information condition information indicating, for example, a condition that a time interval between the action of opening the lid of the washing machine serving as the one device and the following action of opening the door of the refrigerator serving as the another device is limited to be equal to or less than a predetermined time (e.g., one minute).

The verification action information is text information and/or sound data representing, for example, "Execute the action of opening the lid of the washing machine firstly; within one minute therefrom, execute the action of opening the door of the refrigerator secondly; and execute the action of opening the door of the microwave oven thirdly". In this example, the action sequence information is text information and/or sound data representing "firstly", "secondly", and "thirdly"; the condition information is text information and/or sound data representing "within one minute therefrom".

In Step S17 (FIG. 3), the collation part 104 collates the respective actions having been executed to the washing machine, the refrigerator, and the microwave oven after the notification of the verification action information in Step S15 (FIG. 3) indicated by the action information included in the log information acquired in Step S16 (FIG. 3) with the action of opening the lid of the washing machine, the action of opening the door of the refrigerator, and the action of opening the door of the microwave oven indicated by the verification action information notified in Step S15.

The collation part 104 further refers to the date-and-time information and the action information included in the log information acquired in Step S16 (FIG. 3), and collates an execution order in which the respective actions have been executed to the washing machine, the refrigerator, and the microwave oven after the notification of the verification action information in Step S15 with the execution sequence for the action of opening the lid of the washing machine, the action of opening the door of the refrigerator, and the action of opening the door of the microwave oven, indicated by the action sequence information included in the verification action information notified in Step S15.

Further, the collation part 104 refers to the date-and-time information and the action information included in the log information acquired in Step S16 (FIG. 3), and collates a time interval between the action having been executed to the washing machine serving as the one device and the action having been executed to the refrigerator serving as the another device after the notification of the verification action information in Step S15 (FIG. 3) with the condition indicated by the condition information included in the verification action information notified in Step S15 that "the time interval between the action of opening the lid of the washing machine and the following action of opening the door of the refrigerator is limited to be equal to or less than a predetermined time (e.g., one minute)".

Specifically, the collation part 104 refers to the action information included in the log information acquired in Step S16 (FIG. 3), and determines that the first action executed after the notification of the verification action information is the action of opening the lid of the washing machine, the second action executed thereafter is the action of opening the door of the refrigerator, and the third action executed thereafter is the action of opening the door of the microwave oven as in the sequence indicated by the action sequence information; in this case, the collation part 104 generates collation result information indicating that the user is present in the user employing facility when further determining that the time interval between the action having been executed to the washing machine serving as the one device and the action having been executed to the refrigerator serving as the another device is equal to or less than the predetermined time as in the condition indicated by the condition information. Otherwise, the collation part 104 generates collation result information indicating that the user is not present in the user employing facility.

In this regard, the notification part 103 may include in the verification action information, condition information indicating a condition that a time interval between the action of opening the lid of the washing machine serving as the one device executed firstly and the action of opening the door of the microwave oven serving as the another device executed finally is limited to be equal to or less than a predetermined time (e.g., five minutes).

The verification action information is text information and/or sound data representing, for example, "Execute the action of opening the lid of the washing machine firstly; execute the action of opening the door of the refrigerator secondly; within five minutes from the first action, execute the third action of opening the door of the microwave oven". In this example, the action sequence information is text information and/or sound data representing "firstly", "secondly", and "the third"; the condition information is text information and/or sound data representing "within five minutes from the first action".

This configuration enables the verification of presence of the user in the user employing facility when the collation result information indicates that: the respective verification actions having been executed to the plurality of devices 20 designated as the verification-use device agree with the respective verification actions to the plurality of devices 20; the execution order in which the respective verification actions have been executed to the plurality of devices 20 agrees with the execution sequence indicated by the action sequence information; and the time interval between the action having been executed to the one device and the action having been executed to the another device satisfies the condition indicated by the condition information. Thus, this configuration enables a more accurate verification in comparison with a case that the verification action information does not include the condition information.

(4) In the configurations of Modifications (2) and (3), the device management information may further include information (hereinafter, position information) indicative of a position at which a device 20 is disposed. The position information is, for example, information indicative of a latitude, a longitude, and an altitude of the position at which the device 20 is disposed. The position information is not limited to this, and may be information indicative of, for example, the latitude and the longitude of the position at which the device 20 is disposed.

Further, in the configurations of Modifications (2) and (3), in Step S14, the notification part 103 may determine an execution sequence for respective verification actions to a plurality of devices 20 designated as the verification-use device as follows.

Specifically, the notification part 103 may refer to the position information included in the device management information acquired in Step S12 (FIG. 3), and determine the execution sequence so as to ensure a minimum movement distance of the user until the final verification action is executed to a verification-use device after the first verification action is executed to a verification-use device by using a known pathfinding algorithm. This configuration can make the time necessary for the user to execute the verification actions minimum.

Alternatively, the notification part 103 may refer to the position information included in the device management information acquired in Step S12 (FIG. 3), and determine the execution sequence so as to ensure a maximum movement distance of the user until the final verification action is executed to a verification-use device after the first verification action is executed to a verification-use device by using a known pathfinding algorithm.

This configuration can reduce the possibility that the execution sequence of the respective verification actions to the plurality of devices 20 designated as the verification-use device becomes the same as a normally executed order thereof in the user employing facility. In the case that the user is not present in the user employing facility, thus, the possibility can be reduced that the user is erroneously verified to be present in the user employing facility due to the fact that another person executes the respective verification actions to the plurality of devices 20 in the execution sequence indicated by the action sequence information.

(5) A verification information generating server that is communicable with the verification server 10 through the communication network 90 may serve as a part of the verification server 10. Specifically, the verification information generating server may execute Step S12 to Step S14 shown in FIG. 3 instead of the verification server 10, and the verification information generating server may transmit the verification action information generated in Step S14 to the verification server 10. In Step S15 (FIG. 3), the notification part 103 may notify the verification action information received by the communication circuit 120.

(6) The device DB 40 (FIG. 1) may be included in a storage area of the memory 110 (FIG. 2) included in the verification server 10.

As described above, the present disclosure can be used in a private service, a service by a public agency, remote control of a device in a facility, and a home security service for verifying that a user is present in a facility indicated by a certain address.

The invention claimed is:

1. A verification method, by a computer, comprising:
accepting information that requires verification of presence of a user in a certain place;
designating one or more first devices in the certain place as a verification-use device;
notifying verification action information indicating execution guidance for a verification action to the verification-use device;
collating the verification action information with information indicative of an action having been executed to the verification-use device after the notification of the verification action information; and
outputting information indicative of a result of the collation, wherein
the one or more first devices include a plurality of first devices,
in the designation of the verification-use device, the plurality of first devices is designated as the verification-use device,
in the notification of the verification action information, verification actions to the plurality of first devices are determined and information indicating execution guidance for the respective verification actions to the plurality of first devices is notified as the verification action information, and
in the collation, information indicative of respective actions that have been executed to the plurality of first devices after the notification of the verification action information is collated with the verification action information.

2. The verification method according to claim 1, wherein, in the designation of the verification-use device, a device that is executable among the one or more first devices is designated as the verification-use device.

3. The verification method according to claim 1, further comprising:
acquiring history information indicative of a history of the action that has been executed to the verification-use device, wherein,
in the notification of the verification action information, an action which is lower in execution frequency among actions executable to the verification-use device than a predetermined frequency is determined with reference to the history information as the verification action.

4. The verification method according to claim 1, wherein the verification action information includes action sequence information indicating an execution sequence for the respective verification actions to the plurality of first devices, and
in the collation, an execution order in which the respective verification actions have been executed to the plurality of first devices after the notification of the verification action information is further collated with the execution sequence for the respective verification actions to the plurality of first devices indicated by the action sequence information.

5. The verification method according to claim 4, wherein the verification action information further includes condition information indicating a condition for a time interval between a verification action on a second device included in the plurality of first devices and a verification action on a third device included in the plurality of first devices, and in the collation, a time interval between an action having been executed to the second device and an action having been executed to the third device is further collated with the condition indicated by the condition information.

6. The verification method according to claim 5, wherein the action sequence information indicates that the verification action to the third device is executed after the verification action to the second device is executed.

7. The verification method according to claim 5, wherein the action sequence information indicates that the verification action to the second device is executed firstly and the verification action to the third device is executed finally.

8. The verification method according to claim 7, further comprising:

acquiring position information indicative of a position at which a verification-use device is disposed, wherein in the notification of the verification action information, the execution sequence indicated by the action sequence information is determined with reference to the position information so as to ensure a minimum movement distance until the verification action to the third device is executed after the verification action to the second device is executed.

9. The verification method according to claim 7, further comprising:

acquiring position information indicative of a position at which a verification-use device is disposed, wherein in the notification of the verification action information, the execution sequence indicated by the action sequence information is determined with reference to the position information so as to ensure a maximum movement distance until the verification action to the third device is executed after the verification action to the second device is executed.

10. A verification device comprising:

a processor;

a memory storing instructions that, when executed by the processor, cause the processor to perform operations for:

accepting information that requires verification of presence of a user in a certain place;

designating one or more first devices in the certain place as a verification-use device;

notifying verification action information indicating execution guidance for a verification action to the verification-use device;

collating the verification action information with information indicative of an action having been executed to the verification-use device after the notification of the verification action information; and outputting information indicative of a result of the collation, wherein the one or more first devices include a plurality of first devices, in the designation of the verification-use device, the plurality of first devices is designated as the verification-use device, in the notification of the verification action information, verification actions to the plurality of first devices are determined and information indicating execution guidance for the respective verification actions to the plurality of first devices is notified as the verification action information, and in the collation, information indicative of respective actions that have been executed to the plurality of first devices after the notification of the verification action information is collated with the verification action information.

11. A non-transitory computer readable storage medium storing a program causing a computer to serve as:

an acceptance part for accepting information that requires verification of presence of a user in a certain place;

a designation part for designating one or more first devices in the certain place as a verification-use device;

a notification part for notifying verification action information indicating execution guidance for a verification action to the verification-use device;

a collation part for collating the verification action information with information indicative of an action having been executed to the verification-use device after the notification of the verification action information; and an output part for outputting information indicative of a result of the collation, wherein the one or more first devices include a plurality of first devices, the designation part designates the plurality of first devices is designated as the verification-use device, the notification part determines verification actions to the plurality of first devices and notifies information indicating execution guidance for the respective verification actions to the plurality of first devices as the verification action information, and the collation part collates information indicative of respective actions that have been executed to the plurality of first devices after the notification of the verification action information with the verification action information.

* * * * *